June 2, 1964
G. L. BUTLER ETAL
3,135,055
WORKPIECE INSPECTION SYSTEM
Filed Oct. 19, 1960
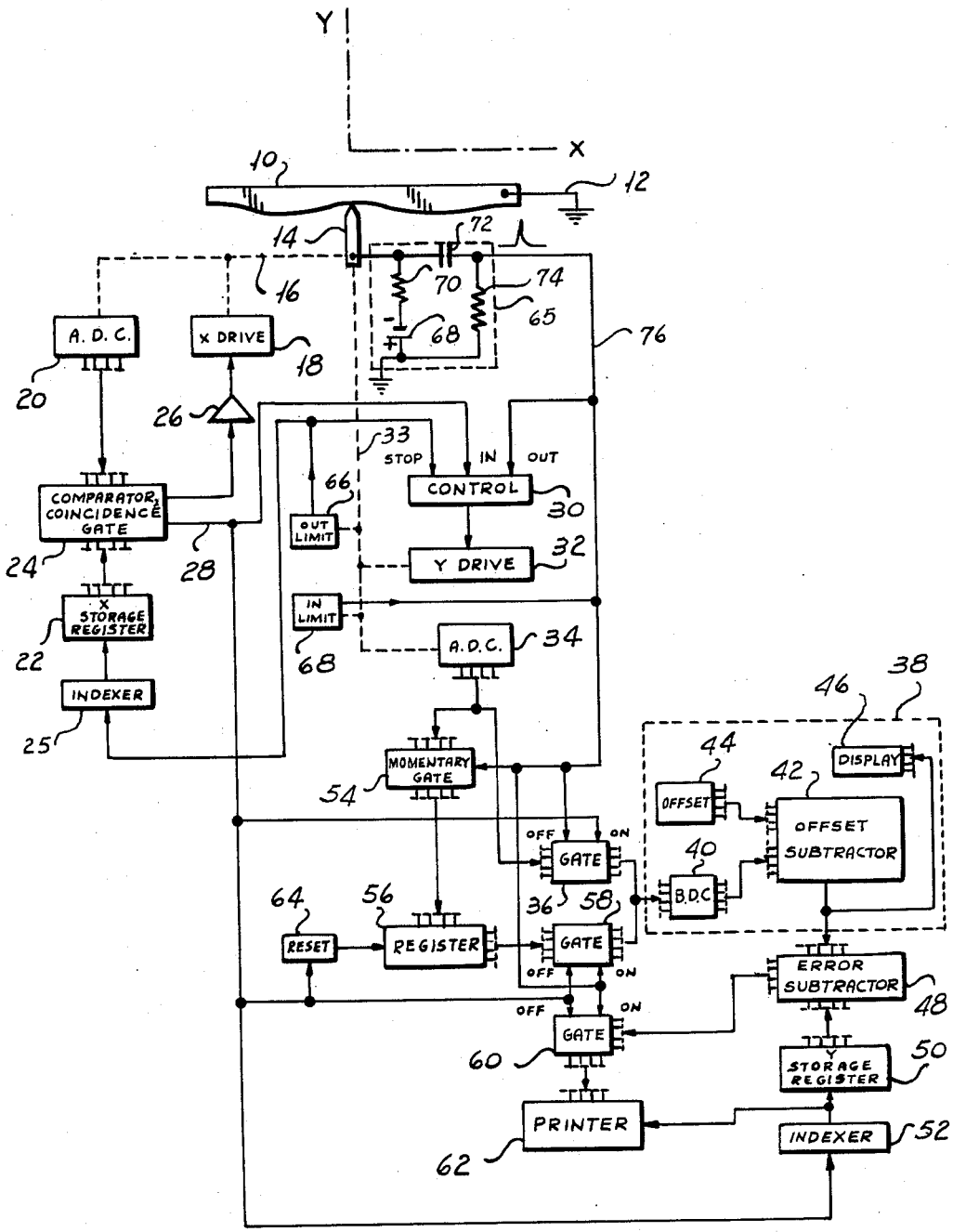
INVENTORS
GEORGE L. BUTLER
MARVIN R. EMERSON
BY
*Henry L. Skenier*
ATTORNEY

United States Patent Office 3,135,055
Patented June 2, 1964

---

3,135,055
WORKPIECE INSPECTION SYSTEM
George L. Butler, Lomita, and Marvin R. Emerson, Rolling Hills, Calif., assignors to United Aircraft Corporation, East Hartford, Conn., a corporation of Delaware
Filed Oct. 19, 1960, Ser. No. 63,681
4 Claims. (Cl. 33—174)

Our invention relates to workpiece inspection systems and more particularly to a digital workpiece inspection system which provides a continuous digital display of inspection probe position and automatic digital printout of the position of the inspection probe upon contact with the workpiece.

In workpiece inspection systems, that is, systems for determining the physical dimensions of a workpiece, the optimum system will provide measurement, control, display and recording of measurements in usable form. Since the motion of a controlled member in such system is basically analogue in nature, most of the inspection systems in the prior art operate entirely in the analogue domain. Analogue systems are inherently limited in their accuracy and in their ability to inspect objects having complex geometry. Many of these systems also require long set-up times and require highly skilled workmen for their operation. Since the input command to an inspection system is advantageously digital, it is highly desirable to have a digital inspection system. According to this invention, this is done by immediately converting the analogue feedback to a digital quantity thus facilitating the mechanics of providing visual display and numerical printout. We thus make it possible to provide a totally automatic and highly flexible workpiece inspection system.

One object of our invention is to provide a digital workpiece inspection system which is highly accurate.

Another object of our invention is to provide a digital workpiece inspection system which is capable of inspecting objects of complex geometry.

Yet another object of our invention is to provide a digital workpiece inspection system which requires a short set-up time.

A further object of our invention is to provide a digital workpiece inspection system which is highly flexible in its application.

A still further object of our invention is to provide a digital workpiece inspection system which will provide continuous numerical display of inspection probe position.

A still further object of our invention is to provide a digital workpiece inspection system which will provide numerical print out or tape record of the position of inspection probe upon contact with the workpiece.

Other and further objects of our invention will appear from the following description.

In general our invention contemplates the provision of an inspection probe which is movable along any desired axis by means of an axis drive and drive control. An analogue-to-digital converter encodes the instantaneous position of the probe in one axis into a digital value which is compared in a digital comparator with a stored desired value from a storage register. Any difference between the two values produces an error signal which drives the probe until exact coincidence is reached. At this instant, motion of the probe in a second axis towards the workpiece is begun. The instantaneous position of the inspection probe along this second axis is converted into a digital value by a second analogue-to-digital converter and is continuously indicated on a position display unit. The position of the probe upon contact with the workpiece is compared with desired stored value by means of a digital subtractor and any difference is printed out. The probe is then moved to a new inspection point.

The accompanying drawing, which forms part of the instant specification and which is to be read in conjunction therewith, is a block diagram of our workpiece inspection system. Only the initial and terminal paths of the multi-channel connections are shown for reasons of clarity in following the channels.

Referring now more particularly to the drawing, we provide an electrically conductive workpiece 10 which is grounded through conductor 12. An electrically conductive inspection probe 14 is mounted for movement along two axes preferably at right angles to each other in any desired manner known to the art. The mounting means per se forms no part of this invention and is therefore not shown in detail. The probe is connected to an X axis drive 18 by means of a linkage 16. It will be appreciated by those skilled in the art that an inductance probe, capacitance probe or the like could be used in place of electrically conductive probe 14. Drive 18 may be any suitable motor. Linkage 16 also connects probe 14 to an analogue-to-digital converter 20 which is preferably that shown in U.S. patent of Martin Ziserman 2,873,-442 dated February 10, 1959, but may be of any type well known to the art. A comparator and coincidence gate 24 is provided to compare digital values from converter 20 with those from an X storage register 22 which may, for example, be magnetic tape or any other storage device known in the art. Comparator 24 is preferably of the type shown in co-pending application of Myron J. Mendelson and Charles A. Krause, Serial No. 820,465, filed June 15, 1959, now Patent No. 3,035,770 but may be any type of comparator known in the art which provides an indication of the relative magnitudes and sign or sense between two digital numbers. An indexer 25 which may, for example, be a stepping switch known to the art is provided to step register 22 to feed stored X values to comparator 24. An amplifier 26 is provided to amplify voltages from comparator 24 to be fed to X drive 18.

A conductor 28 carries a "coincidence" signal from comparator 24 to the "in" terminal of control 30 of Y drive 32, to the "on" terminal of gate 36, to the "off" terminals of gates 58 and 60, to a second indexer 52, and to reset 64. Control 30 may be, for example, a relay control device or the like known to the art. Y drive 32 which may be a motor is connected to probe 14 by means of linkage 33. Linkage 33 also connects probe 14 to an out limit switch 66, to an in limit switch 68 and to a second analogue-to-digital converter 34 of a type shown in Patent No. 2,873,442 hereinabove referred to.

A digital offset position indicator 38 is fed digital values from analogue-to-digital converter 34 through gate 36. Indicator 38 is preferably that shown in the co-pending application of George A. Person, Serial No. 805,620, filed April 10, 1959, and consists of an offset subtractor 42, a binary-coded decimal-to-decimal digital converter 40, an offset 44 and a display unit 46, all described in detail in the aforementioned co-pending application Serial No. 805,620. It will be appreciated that any other suitable indicator known to the art could be used.

An error subtractor 48 of a type similar to subtractor 42, described in the aforementioned co-pending application of George A. Person, Serial No. 805,620, receives stored Y digital values from Y storage register 50. Register 50 is similar to register 22 and may be magnetic tape or any other suitable storage known to the art. It is understood of course that the desired values are stored in the registers 22 and 50. An indexer 52 which may, for example, be a stepping switch steps register 50 to cause Y values to be fed to subtractor 48 and also steps printer 62 which is of a type well known to those skilled in the art which may, for example, print out a decimal number in response to a decimal digital input signal. An appropriate printer is described in Shepard Patent 2,787,210, dated April 2, 1957.

A pulse generating network 65 produces a pulse when probe 14 contacts workpiece 10. This pulse generating network may consist, for example, of a battery 68 with positive terminal grounded and negative terminal connected to a resistor 70. A condenser 72 has one side connected to resistor 70 and to probe 14. A resistor 74 is connected between the other side of condenser 72 and ground. It will be appreciated by those skilled in the art that any other appropriate pulse generator could be used in place of network 65.

A conductor 76 carries this pulse to the "out" terminal of control 30, to momentary gate 54, to the "off" terminal of gate 36 and to the "on" terminals of gates 58 and 60. Gates 36, 58 and 60 are of a type well known in the art which have two stable states either conductive or non-conductive. Momentary gate 54 is of a type well known in the art which is normally nonconductive but which can be made conductive only for the duration of an input selection pulse. Such gate is shown on page 14–42 or on page 14–27 "Handbook of Automation, Computation and Control," volume 2, published by John Wiley and Sons, Inc., 1959. By incorporating a bistable transistor circuit shown in FIGURE 15.6 of "Handbook of Semiconductor Electronics" published 1956 by McGraw-Hill Book Company, Inc. with a gate as gate 54, gates 36, 58, and 60 are obtained. It is understood that any other type of gate operating as described can be used. The pulse from generator 65 is sharply spiked so that gate 54 will be made conductive only long enough so that the instantaneous digital position of the probe upon contact may be fed to register 56. Any overtravel by probe 14 will, therefore, not be fed to register 56 and instantaneous position on contact is effectively "locked into" register 56. Register 56 is of a type well known in the art which will accept a single multi-digit number but which must be cleared before another value can be fed into it. Reset 64 may be any appropriate type known in the art which will clear register 56 to enable it to receive a new digital value.

"Out" limit switch 66 is connected to the "stop" terminal of control 30 and to indexer 25. "In" limit switch 68 is connected to conductor 76 and produces an output pulse similar to that generated by network 65 when it is desired that probe 14 should not travel past a preselected programmed end point and contact with workpiece 10 has not been made prior to reaching this end point.

In operation, analogue-to-digital converter 20 converts the instantaneous position of probe 14 in the X axis to a binary-coded-decimal digital representation which is compared in comparator 24 with desired X values from register 22. These desired values are also in binary-coded decimal digital form. Any difference between the two values produces an error voltage which is amplified by amplifier 26 to cause drive 18 to move the probe in the direction of the desired check point along the X axis. When the difference between the two values reach zero, the X drive will stop and a "coincidence" signal will be produced by comparator and coincidence gate 24. This signal is fed through conductor 28 to control 30 to cause Y drive 32 to begin movement of probe 14 in the Y axis toward workpiece 10. This "coincidence" signal also causes gate 36 to become conductive, causes gates 58 and 60 to become nonconductive, steps indexer 52 to cause Y storage values to be fed from register 50 to subtractor 48 and causes reset 64 to clear register 56. The instantaneous position of probe 14 in the Y axis is converted into a binary-coded-decimal digital representation by analogue-to-digital converter 34 and fed through conductive gate 36 to digital offset position indicator 38. Since momentary gate 54 is normally nonconductive, no signal will be fed to register 56. Binary-coded-decimal digital to decimal digital converter 40 of indicator 38 converts this signal to decimal digital form which is then fed to offset subtractor 42. A decimal digital offset value may be subtracted from this actual positional digital value in order to provide an arbitrary dimensional origin when desired. This permits arbitrary location of workpiece during setup and permits inspection of the workpiece directly as dimensioned. It will readily be appreciated that the offset of the workpiece from the absolute reference must be fed into the offset 44 of the unit 38 in order that proper indications be provided by our system. Instantaneous offset position is indicated in decimal numerical form on display 46 and also subtracted from decimal digital desired Y values from register 50. Since gate 60 is nonconductive, any difference between these values will not be fed to printer 62. It is to be understood that if desired, a digital display or other recording means known to the art may be employed instead of a printer. If a record is desired the digital display may be sequentially photographed.

When probe 14 comes into contact with workpiece 10, pulse generating network 66 will be shorted to ground through conductive probe 14, conductive workpiece 10 and conductor 12. Capacitor 72 is normally charged negatively by battery 68 with no curent flowing through resistor 74. When condenser 72 is grounded by probe 14, it will discharge through resistor 74 creating a positive pulse of voltage across it. If the time constant as determined by condenser 72 and resistor 74 is made very short, the pulse generated will have a peak that is sharply spiked. This pulse is fed through conductor 76 to control 30 to cause Y drive 32 to reverse and begin moving probe 14 away from workpiece 10. This pulse also causes gate 36 to become nonconductive, causes gates 58 and 60 to become conductive and momentarily causes gate 54 to become conductive so that the instantaneous position of probe 14 upon contact will be fed from converter 34 in binary-coded-decimal digital form to register 56. As hereinabove described, any overshoot of probe 14 will not be fed to register 56. Since gate 58 is now conductive and gate 36 is nonconductive, indicator 38 will now receive information only from register 56.

The offset contact position will be numerically indicated on display 46. This offset position in decimal digital form is also fed to error subtractor 48 where it is subtracted from desired Y values from register 50.

Since gate 60 is now conductive, any difference between these two values will be fed to printer 62, where it will be printed out in numerical form. When probe 14 has moved a predetermined distance away from workpiece 12, "out" limit switch 66 will cause control 30 to stop probe motion in the Y axis and will cause indexer 25 to step register 22 so that new X values will be fed to comparator 24. Probe 14 will then be moved to the next inspection point along the X axis.

As hereinabove described, limit switch 68 will stop the motion of probe 14 toward the workpiece if the probe reaches a predetermined programmed end point before making contact with the workpiece. The same sequence of events will be initiated as if a pulse had been produced by network 66.

It will be appreciated by those skilled in the art that if a nonconductive workpiece were being inspected, a pressure-sensitive probe could be substituted for electrically conductive probe 14 in which case a suitable pulse generator known to the art would be used in place of pulse network 66.

It will be understood that visual display of probe position in more than one axis may readily be provided if desired. It will also be appreciated that the Y an X axes are chosen by way of example only and not by way of limitation and that therefore inspection and control could be provided in any number of desired axes.

Thus it will be seen that we have accomplished the objects of our invention. We have invented a digital workpiece inspection system which is highly accurate and capable of inspecting the most complex objects. Our invention is highly flexible and requires a minimum of set-up time. Our inspection system provides continuous numerical display of inspection probe position and numerical printout or tape record of probe position upon contact with the workpiece.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A digital workpiece inspection system including in combination means for sensing the physical boundary of a workpiece, means for moving said sensing means into proximity with said workpiece, means for converting the position of said sensing means into a digital representation, means for storing desired digital representations, a digital subtractor for subtracting a desired digital representation and said position digital representation from one another to produce an output that is the digital difference between the said digital representations, a recorder responsive to said digital difference, means for feeding said digital difference to said recorder and means for actuating said last named means at the instant the boundary is determined.

2. A digital workpiece inspection system including in combination a probe for sensing the physical boundary of a workpiece, means for moving said probe into proximity with the workpiece, means for converting the position of said probe to a digital representation, a display for digitally and visually indicating the position of said probe, a register adapted to store the digital position of said probe, means for recording the position of said probe, a normally closed gate for controlling communication between said register and said recording means, means for feeding the output of said converter to said display, means for producing a signal at the instant said probe senses the boundary of the workpiece, means responsive to said signal for causing the output of said converter to be stored in said register and for preventing any further representations from said converter from being fed to said display, means responsive to said signal for opening said normally closed gate and means for feeding the stored position in said register to said display and said recorder.

3. A digital workpiece inspection system including in combination a probe for sensing the physical boundary of a workpiece, means for moving said probe into proximity with the workpiece, means for converting the position of said probe to a digital representation, a display for digitally and visually indicating the position of said probe, a register adapted to store the digital position of said probe, means for storing digital representations of desired value, means for subtracting said digital representation of position and said desired digital representation from one another to produce an output which is the difference between said digital representations, recording means responsive to said digital difference, a normally closed gate for controlling communication between said subtracting means and said recording means, means for feeding the output of said converter to said display, means for producing a signal at the instant said probe senses the boundary of the workpiece, means responsive to said signal for causing the output of said converter to be stored in said register and for preventing any further representations from said converter from being fed to said display, means responsive to said signal for opening said normally closed gate and means for feeding the stored position in said register to said display and said subtracting means.

4. A digital workpiece inspection system including in combination a probe for sensing the physical boundary of a workpiece, a drive for moving said probe into proximity with said workpiece, means for converting the position of said probe into a digital representation, means for producing an offset digital representation, a first digital subtractor for subtracting said offset digital representation from said position digital representation, means for displaying the output from said first subtractor in digital form, means for storing desired digital representations, a second digital subtractor for subtracting the output from said first subtractor and said stored desired values from one another to produce an error representation, a recorder responsive to said error representation, a normally conductive first gate for controlling communication between said converter and said first subtractor, a register, a second gate normally nonconductive for controlling communication between said converter and said register, a third gate normally nonconductive for controlling communication between said register and said first subtractor, a fourth gate normally nonconductive for controlling communication between said second subtractor and said recorder, means for producing a signal at the instant said probe senses the boundary of the workpiece and means responsive to said signal for causing said first gate to become nonconductive and for causing said third and fourth gates to become conductive and for causing said second gate to become momentarily conductive, the construction being such that the digital representation of the instantaneous position of said probe upon sensing the boundary of said workpiece is fed to said register and the digital representation of any overtravel by said probe is prevented from being fed to said register.

References Cited in the file of this patent

UNITED STATES PATENTS

| 2,835,042 | Tandler et al. | May 20, 1958 |
| 2,976,525 | Bossung | Mar. 21, 1961 |

FOREIGN PATENTS

| 1,114,501 | France | Dec. 19, 1955 |